(12) United States Patent
Qu et al.

(10) Patent No.: US 12,285,010 B2
(45) Date of Patent: Apr. 29, 2025

(54) SAMPLE COOLING AND STORAGE MECHANISM

(71) Applicant: SHANGHAI ORIGINCELL BIOLOGICAL CRYO EQUIPMENT CO., LTD., Shanghai (CN)

(72) Inventors: Jianguo Qu, Shanghai (CN); Zhikang Liu, Shanghai (CN)

(73) Assignee: SHANGHAI ORIGINCELL BIOLOGICAL CRYO EQUIPMENT CO., LTD., Shanghai (CN)

( * ) Notice: Subject to any disclaimer, the term of this patent is extended or adjusted under 35 U.S.C. 154(b) by 53 days.

(21) Appl. No.: 18/286,588

(22) PCT Filed: Mar. 25, 2022

(86) PCT No.: PCT/CN2022/082896
§ 371 (c)(1),
(2) Date: Oct. 12, 2023

(87) PCT Pub. No.: WO2022/237344
PCT Pub. Date: Nov. 17, 2022

(65) Prior Publication Data
US 2024/0196884 A1 Jun. 20, 2024

(30) Foreign Application Priority Data

May 11, 2021 (CN) .......................... 202120995343.1

(51) Int. Cl.
*F25D 16/00* (2006.01)
*A01N 1/145* (2025.01)
*A01N 1/162* (2025.01)

(52) U.S. Cl.
CPC ............. *A01N 1/145* (2025.01); *A01N 1/162* (2025.01)

(58) Field of Classification Search
CPC .......... F25D 16/00; F25D 25/04; F25D 29/00; F25D 3/11; B01L 1/02; B01L 2300/047
See application file for complete search history.

(56) References Cited

U.S. PATENT DOCUMENTS 5,205,128 A    4/1993  Richard
11,071,978 B2 *  7/2021  Crum ...................... B01L 3/502
(Continued)

FOREIGN PATENT DOCUMENTS

CN    103975914 A    8/2014
CN    206776612 U   12/2017
(Continued)

*Primary Examiner* — Filip Zec
(74) *Attorney, Agent, or Firm* — Bayramoglu Law Offices LLC

(57) ABSTRACT

A sample cooling and storage mechanism includes a refrigeration device and a gradient cooling device. The refrigeration device is configured to perform temperature-controlled refrigeration on storage vials. The gradient cooling device is configured to perform programmed gradient cooling on the storage vials. The refrigeration device includes at least one refrigeration zone. A nitrogen spraying component, a heating component and a storage vial rack are provided in the refrigeration zone. The nitrogen spraying component is configured to spray nitrogen in the refrigeration zone. The heating component heats the interior of the refrigeration zone. The sample cooling and storage mechanism achieves a gradient cooling function for biological samples through the gradient cooling device, thereby preventing damage to the biological samples caused by rapid cooling. In addition, the sample cooling and storage mechanism achieves a temperature-controlled refrigeration function for the biological samples through the refrigeration device.

17 Claims, 5 Drawing Sheets

(56) References Cited

U.S. PATENT DOCUMENTS

| | | | | |
|---|---|---|---|---|
| 2008/0260511 | A1* | 10/2008 | Fattinger | G01N 35/0099 414/788.1 |
| 2013/0011226 | A1* | 1/2013 | Camenisch | A47F 5/00 414/277 |
| 2015/0037830 | A1* | 2/2015 | Jakobsen | B65D 51/2835 435/307.1 |
| 2015/0289500 | A1 | 10/2015 | Fuhr et al. | |
| 2021/0330111 | A1* | 10/2021 | Nowinski | A47G 29/141 |
| 2023/0243523 | A1* | 8/2023 | Guo | F24F 1/40 181/200 |
| 2024/0359914 | A1* | 10/2024 | Caveney | B65G 1/045 |

FOREIGN PATENT DOCUMENTS

| | | |
|---|---|---|
| CN | 206841980 U | 1/2018 |
| CN | 208597615 U | 3/2019 |
| CN | 110667986 A | 1/2020 |
| CN | 211353694 U | 8/2020 |
| CN | 214853921 U | 11/2021 |
| EP | 2492663 A2 | 8/2012 |

* cited by examiner

SAMPLE COOLING AND STORAGE MECHANISM

CROSS REFERENCE TO THE RELATED APPLICATIONS

This application is the national phase entry of International Application No. PCT/CN2022/082896, filed on Mar. 25, 2022, which is based upon and claims priority to Chinese Patent Application No. 202120995343.1, filed on May 11, 2021, the entire contents of which are incorporated herein by reference.

TECHNICAL FIELD

The present disclosure relates to a biological preservation device, and in particular to a sample cooling and storage mechanism.

BACKGROUND

At present, the storage and taking operation of biological sample storage vials and boxes is automated. In the prior art, storage and taking of the storage vials and boxes are implemented through a liquid-nitrogen storage container. The conventional storage of biological samples does not achieve programmed automation, and lacks a programmed cooling process. Biological samples usually need to be stored at ultra-low temperatures (such as −80° C., −140° C., and −196° C.) to maintain their activity. The storage velocity plays an important role in maintaining the activity of biological samples. In conventional storage methods, the storage box in the transfer box or container is directly placed into the liquid-nitrogen storage container, without a gradient cooling operation. As a result, the biological samples are prone to damage due to rapid cooling.

In order to solve the problem of cooling storage and taking of storage vials existing in the prior art, there is an urgent need for a sample cooling and storage mechanism. The sample cooling and storage mechanism is intended to improve the activity of biological samples stored in the storage vials. Adding the gradient cooling of the storage box in the storage process can better maintain the activity of biological samples in the storage box, and reduce safety hazards.

In view of the aforementioned shortcomings in the prior art, it is necessary to design an innovative sample cooling and storage mechanism with industrial value through active research and innovation.

SUMMARY

To solve the aforementioned technical problem existing in the prior art, that is, samples cannot be effectively stored at a suitable temperature and programed gradient-cooling storage of samples cannot be achieved, an objective of the present disclosure is to provide a sample cooling and storage mechanism.

The sample cooling and storage mechanism provided by the present disclosure includes a refrigeration device and a gradient cooling device, where
  the refrigeration device is configured to perform temperature-controlled refrigeration on storage vials; the gradient cooling device is configured to perform programmed gradient cooling on the storage vials; the refrigeration device includes at least one refrigeration zone; a nitrogen spraying component, a heating component and a storage vial rack are provided in the refrigeration zone; the nitrogen spraying component is configured to spray nitrogen in the refrigeration zone; and the heating component heats the interior of the refrigeration zone.

Preferably, the nitrogen spraying component includes a nitrogen spraying tube; the nitrogen spraying tube is provided with a plurality of nitrogen spraying holes; and an end of the nitrogen spraying tube is communicated with a nitrogen supply tube assembly.

Preferably, the heating component includes at least one electric heating element; the nitrogen spraying tube vertically runs through inside the refrigeration zone; and the electric heating element is vertically provided on an inner wall of the refrigeration zone.

Preferably, the storage vial rack is slidable up and down in the refrigeration zone, and a supporting mesh plate is provided below the storage vial rack.

Preferably, the refrigeration device includes a plurality of refrigeration zones, and the plurality of refrigeration zones are arranged in an array in a refrigerator component.

Preferably, an upper end of the refrigeration device is provided with a movable insulation cover, and the movable insulation cover rolls or slides to open or close the refrigeration device;
  the movable insulation cover includes two parallel guide rails, a movable rod with two ends slidably provided on the guide rails, and a flexible insulation cover with one end provided on the movable rod and the other end connected to a counterweight and suspended; and
  the movable insulation cover further includes a drive motor and a drive shaft connected to an output shaft of the drive motor; a driving wheel is provided on the drive shaft; the driving wheel is synchronized and connected to a driven wheel through a driving belt; a second slider is provided on the driving belt; an end of the movable rod is fixedly connected to the second slider; and the second slider is slidably fit with the guide rail.

Preferably, the nitrogen supply tube assembly includes a solenoid valve, a nitrogen supply coil tube, and a heating tube; the nitrogen spraying tube is communicated with the nitrogen supply coil tube; the nitrogen supply coil tube is circled around the heating tube; and the solenoid valve is configured to control the start of the heating tube.

Preferably, the gradient cooling device includes a liquid-nitrogen container, a storage rack located above an opening of the liquid-nitrogen container, and a storage rack lifting device for driving the storage rack to move up and down; and
  the storage rack lifting device includes a frame and a lifter fixed to the frame; a lifting platform of the lifter is provided with a mounting plate; the storage rack is provided at a bottom end of the mounting plate; a lifting motor is provided on the mounting plate; a body of the lifting motor is fixed to the mounting plate; an output shaft of the lifting motor is connected to a screw rod; the screw rod is threaded to a first slider; and the first slider is slidably fit with the mounting plate, and a temperature sensor is provided on the first slider.

Preferably, the sample cooling and storage mechanism further includes a three-axis robotic arm; and the three-axis robotic arm is provided above the refrigeration device and the gradient cooling device and is configured to move the storage vials in three directions.

Preferably, the refrigeration zone is a square box with a certain height, and an upper end surface of the square box is provided with a box insulation cover.

Preferably, the gradient cooling device further includes a nitrogen delivery tube; one end of the nitrogen delivery tube is communicated with the nitrogen supply tube, and the other end of the nitrogen delivery tube serves as an open end and extends into the liquid-nitrogen container; the nitrogen delivery tube is sheathed with a guide sleeve; and the guide sleeve is provided with a plurality of vents.

According to the above technical solution, the embodiment of the present disclosure has at least the following advantages. In the present disclosure, the sample cooling and storage mechanism achieves a gradient cooling function for biological samples through the gradient cooling device, thereby preventing damage to the biological samples caused by rapid cooling. In addition, the sample cooling and storage mechanism achieves a temperature-controlled refrigeration function for the biological samples through the refrigeration device, and strengthens the cold insulation performance of the refrigeration device through a movable insulation cover assembly, achieving automatic storage and taking of the biological samples.

In summary, the sample cooling and storage mechanism of the present disclosure has a gradient cooling function, such that the biological samples are not easily damaged.

The above described is only an overview of the technical solutions of the present disclosure. To understand the technical means of the present disclosure more clearly and implement the technical means according to the content of the specification, the preferred embodiments of the present disclosure are described below in detail with reference to the drawings.

Figure 1:
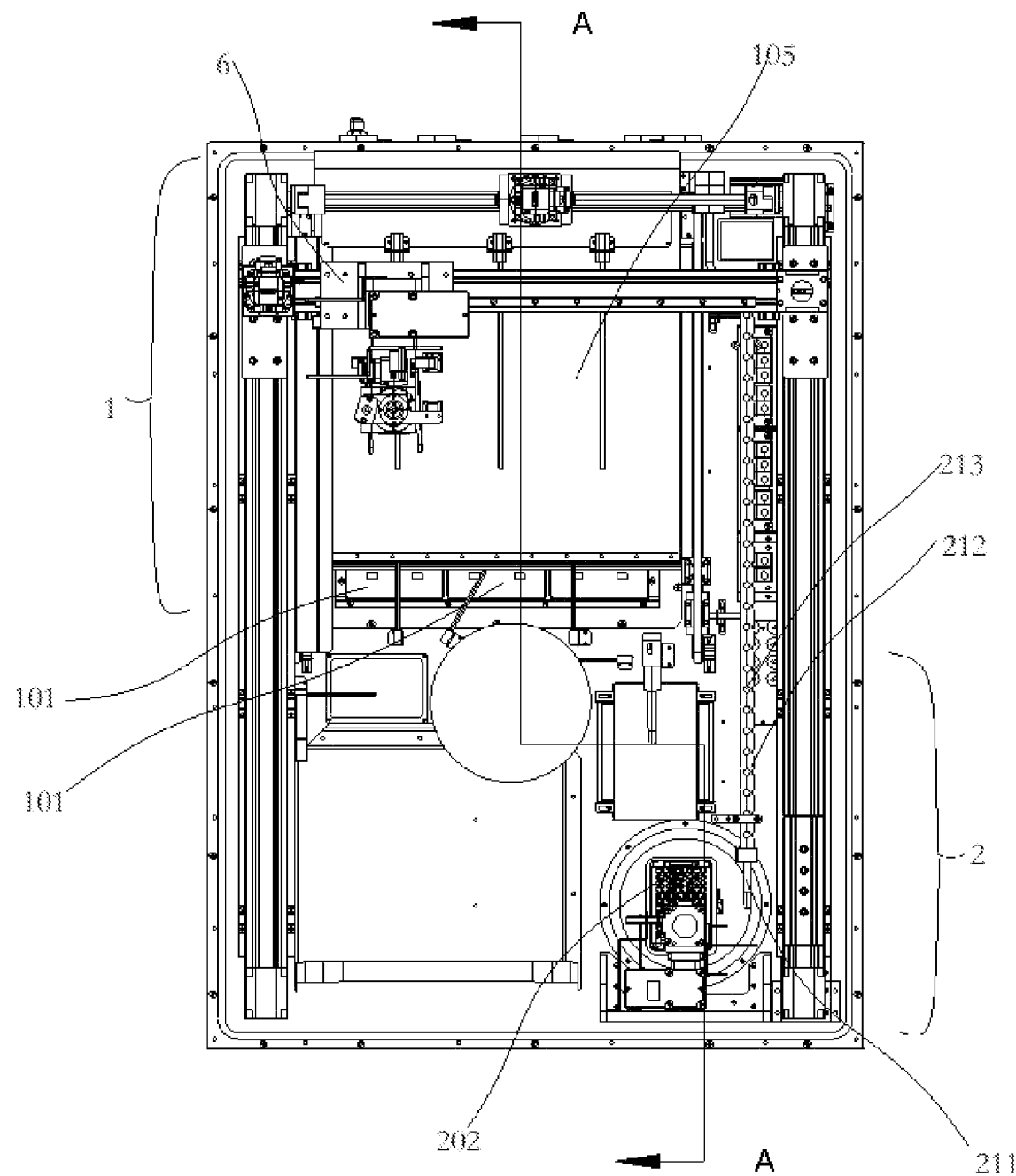
FIG. 1 is a bottom view of a sample cooling and storage mechanism according to the present disclosure.
Figure 2:
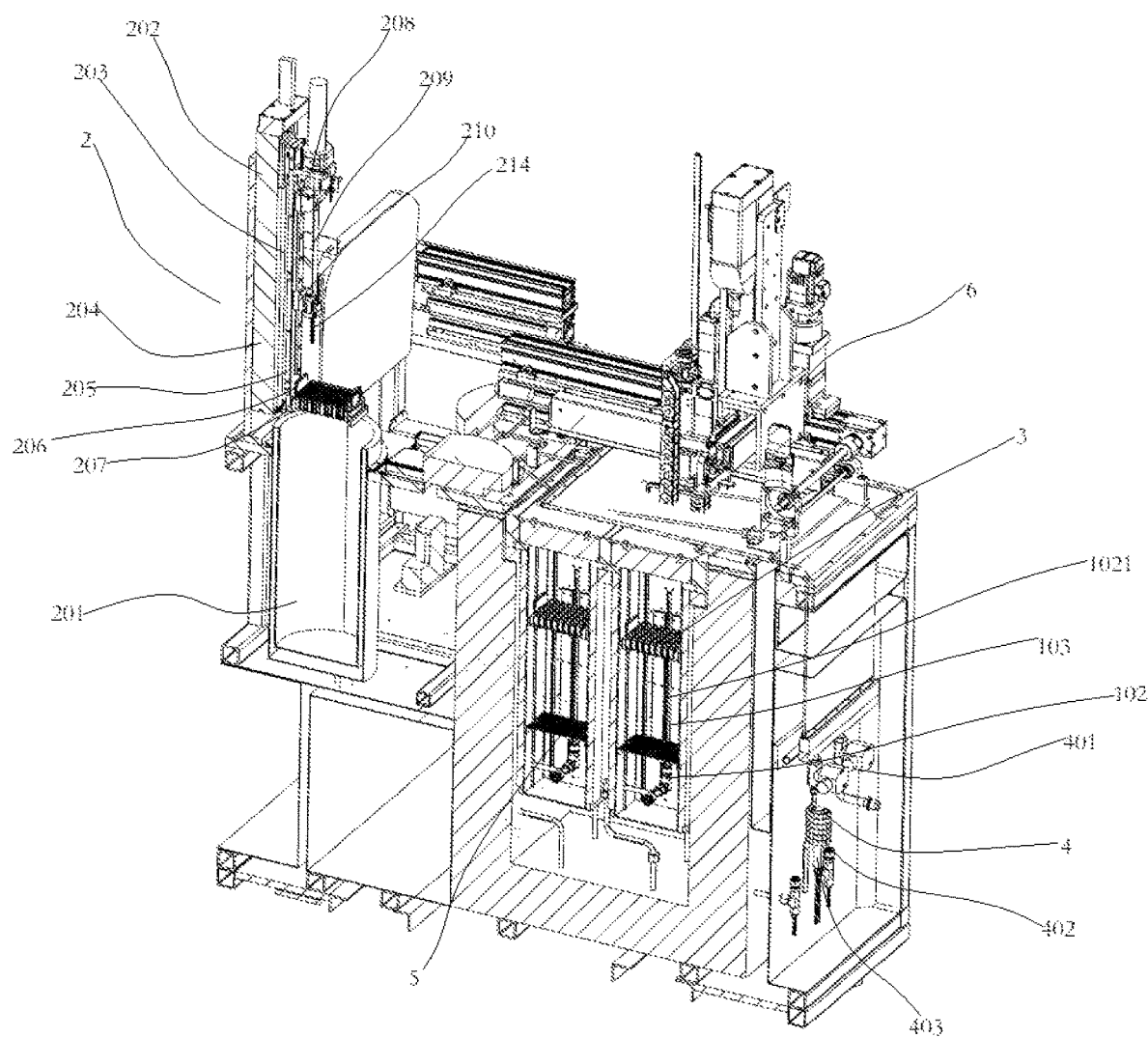
FIG. 2 is a sectional view taken along line A-A shown in FIG. 1.
Figure 3:
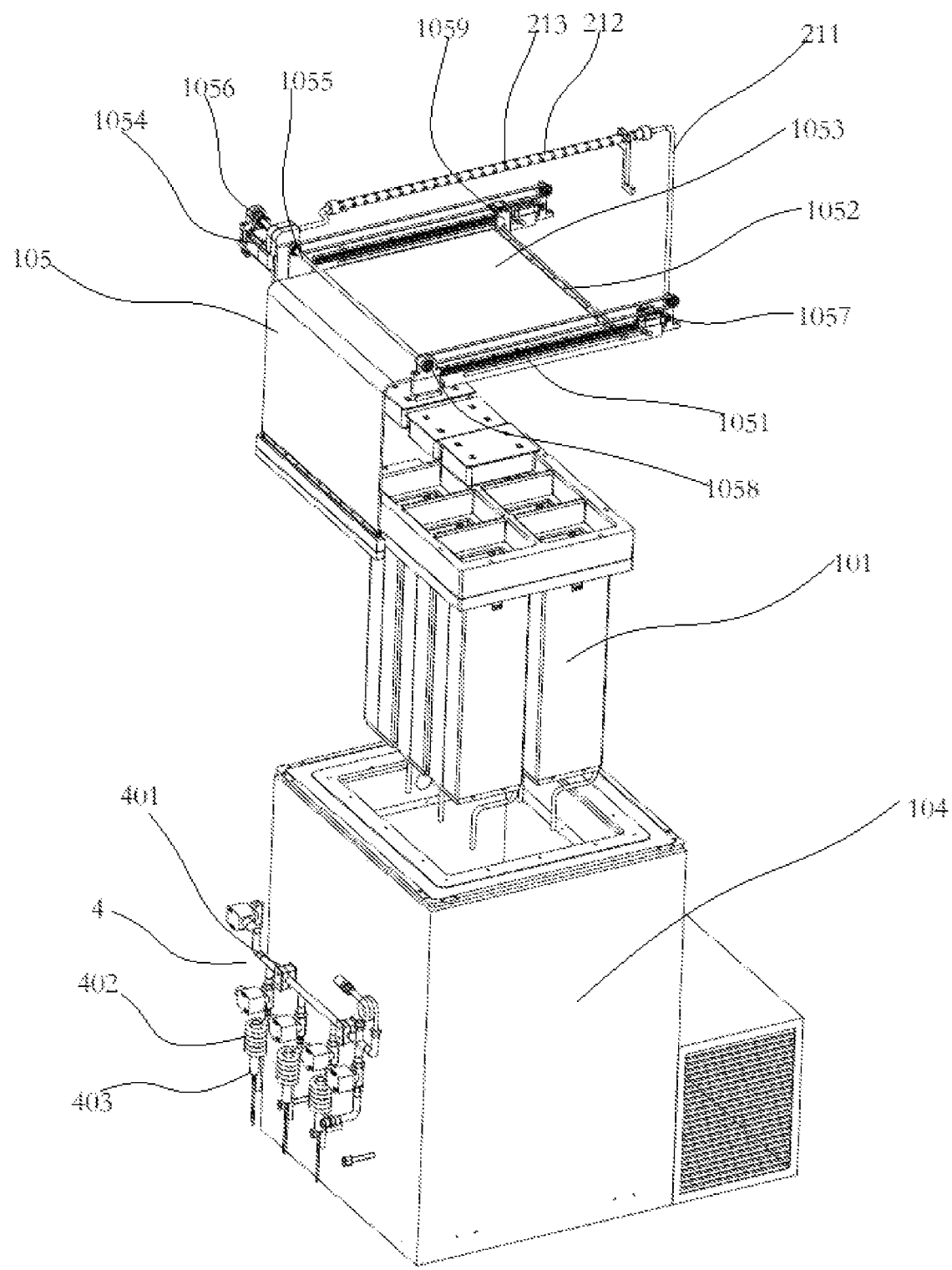
FIG. 3 is a structural diagram of a gradient cooling device and a movable insulation cover.
Figure 4:
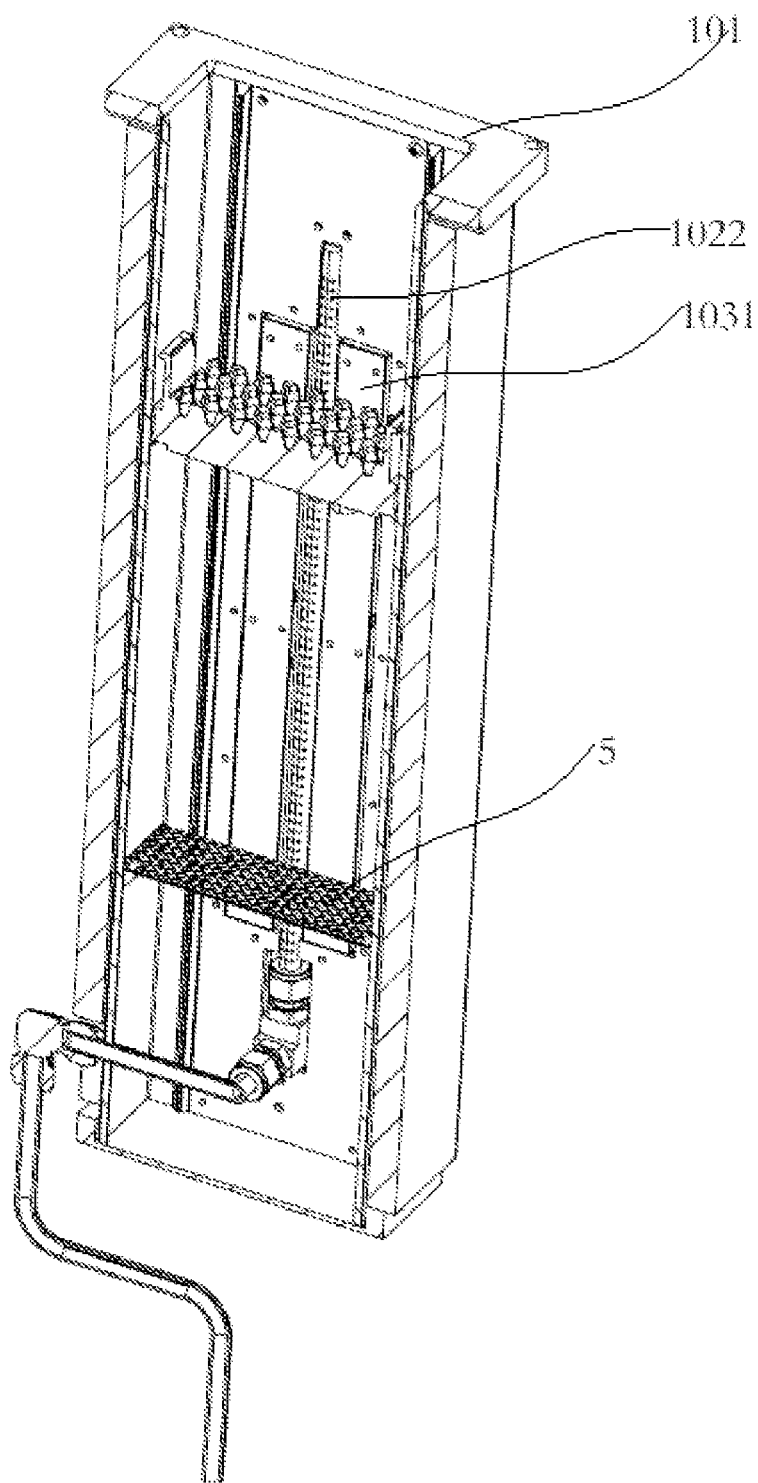
FIG. 4 is a sectional view of a refrigeration zone.
Figure 5:
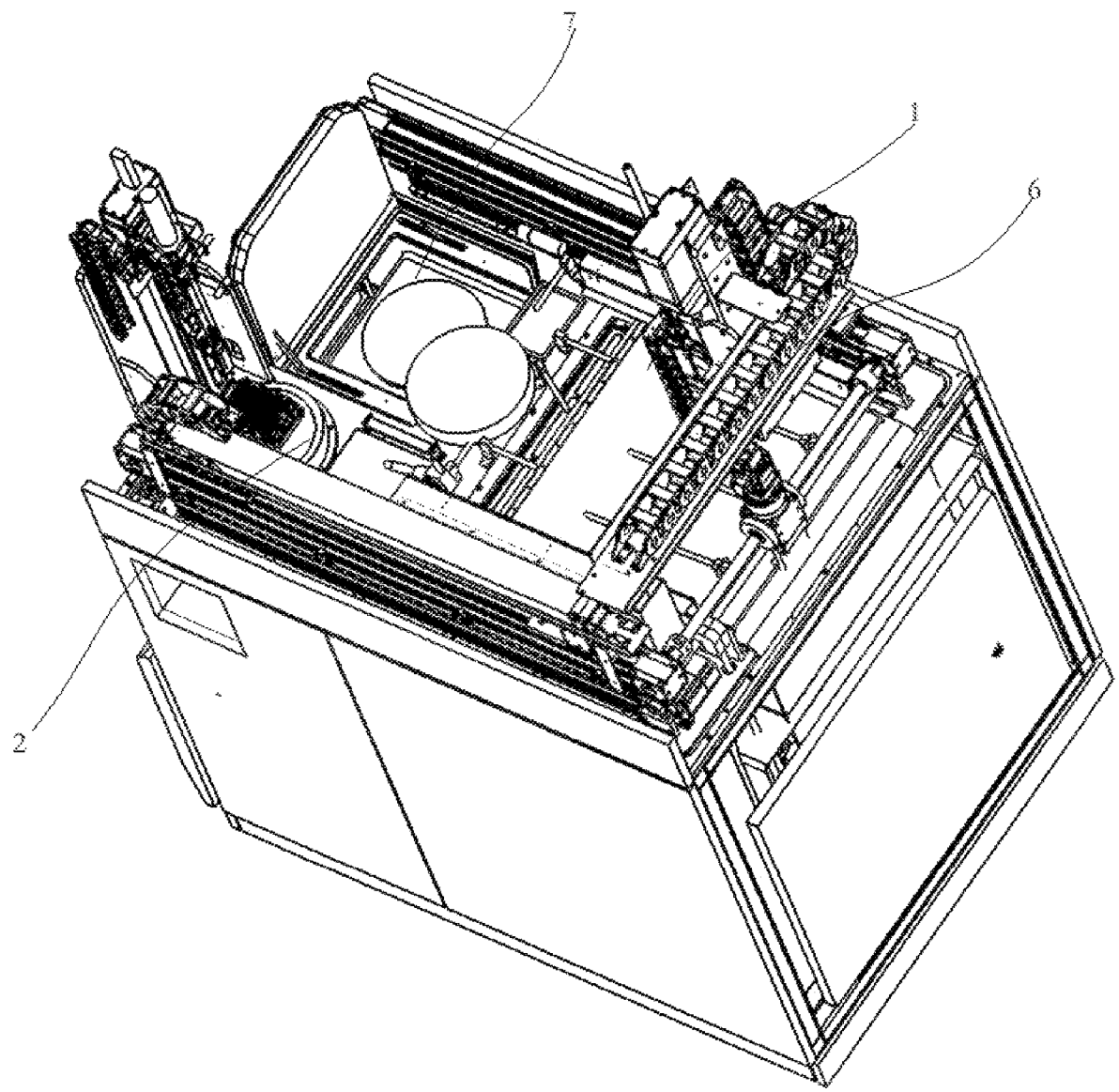
FIG. 5 is an internal view of the sample cooling and storage mechanism according to the present disclosure.

REFERENCE NUMERALS 1. refrigeration device; 101. refrigeration zone; 102. nitrogen spraying component; 1021. nitrogen spraying tube; 1022. nitrogen spraying hole; 103. heating component; 1031. electric heating element; 104. refrigerator component; 105. movable insulation cover; 1051. guide rail; 1052. movable rod; 1053. flexible insulation cover; 1054. drive motor; 1055. drive shaft; 1056. driving wheel; 1057. driving belt; 1058. driven wheel; and 1059. second slider;
2. gradient cooling device; 201. liquid-nitrogen container; 202. storage rack; 203. storage rack lifting device; 204. frame; 205. lifter; 206. lifting platform; 207. mounting plate; 208. lifting motor; 209. screw rod; 210. first slider; 211. nitrogen delivery tube; 212. guide sleeve; 213. vent; and 214. temperature sensor;
3. storage vial rack;
4. nitrogen supply tube assembly; 401. solenoid valve; 402. nitrogen supply coil tube; and 403. heating tube; and
5. supporting mesh plate; 6. three-axis robotic arm; and 7. transfer tank.

DETAILED DESCRIPTION OF THE EMBODIMENTS

The specific implementations of the present disclosure are described in further detail below with reference to the drawings and embodiments. The following embodiments are used to illustrate the present disclosure, rather than to limit the scope of the present disclosure.

Embodiment 1

A sample cooling and storage mechanism includes refrigeration device 1 and gradient cooling device 2. The refrigeration device 1 is configured to perform temperature-controlled refrigeration on storage vials. The gradient cooling device 2 is configured to perform programmed gradient cooling on the storage vials. The refrigeration device 1 includes at least one refrigeration zone 101. Nitrogen spraying component 102 and heating component 103 are provided in the refrigeration zone 101. The nitrogen spraying component 102 is configured to spray nitrogen in the refrigeration zone 101. The heating component 103 heats the interior of the refrigeration zone 101.

Extracted biological samples are stored in the storage vials. Usually, the storage vials are first stored uniformly on storage vial rack 3 and then put into the sample cooling and storage mechanism for storage. The low-temperature storage mechanism in the prior art only focuses on low temperature and does not consider the situation of biological samples themselves. The sample cooling and storage mechanism of the present disclosure is provided with the gradient cooling device 2. The storage vials holding the biological samples are first cooled by the gradient cooling device 2, and then are stored in the refrigeration device 1 for low-temperature storage. The refrigeration device 1 is provided with the nitrogen spraying component 102 and the heating component 103, and the storage vial rack 3 for storing the storage vials is provided in the refrigeration zone 101. After the gradient cooling is completed by the gradient cooling device 2, the storage vials are put into the refrigeration zone 101 of the refrigeration device 1 for refrigeration. The refrigeration zone 101 is different from the liquid-nitrogen container in the prior art. In the prior art, the bottom part of the liquid-nitrogen container is directly provided with a nitrogen supply tube to achieve the refrigeration function. In the present disclosure, the refrigeration zone 101 has a temperature control function, and is more suitable for storing biological samples. The refrigeration zone is provided with the nitrogen spraying component 102. The nitrogen spraying component 102 converts liquid nitrogen into gaseous nitrogen. Therefore, in the present disclosure, the nitrogen is supplied in gaseous form, which is different from the supply of liquid form in the prior art. The liquid nitrogen supply method in the prior art has the problem that the influx of liquid nitrogen will cause too low temperatures at some parts, such as those close to the inlet, and the temperature cannot be controlled. The nitrogen spraying component 102 converts liquid nitrogen into gaseous nitrogen, solving the problem of locally too low temperatures and temperature imbalance, facilitating the storage of the biological samples. The refrigeration device is provided with the heating component 103. When the temperature in the refrigeration zone is too low, the heating component 103 heats the refrigeration zone 101 to achieve the required and adjustable temperatures. Of course, the refrigeration zone 101 is provided with a temperature measurement component, which will not be described herein.

In a further preferred implementation of this embodiment, the nitrogen spraying component 102 includes nitrogen spraying tube 1021. The nitrogen spraying tube 1021 is provided with a plurality of nitrogen spraying holes 1022. An end of the nitrogen spraying tube 1021 is communicated with nitrogen supply tube assembly 4. The shape of the nitrogen spraying tube 1021 is set according to the shape of the refrigeration zone 101, achieving nitrogen balance in the refrigeration zone 101. The nitrogen spraying tube 1021 is communicated with the nitrogen supply tube assembly 4.

In a further preferred implementation of this embodiment, the heating component 103 includes at least one electric heating element 1031. The nitrogen spraying tube 1021 vertically runs through inside the refrigeration zone 101. The electric heating element 1031 is vertically provided on an inner wall of the refrigeration zone 101. When the temperature in the refrigeration zone is too low, the electric heating element 1031 heats to reach the required temperature.

In a further preferred implementation of this embodiment, the storage vial rack 3 is slidable up and down in the refrigeration zone 101, and supporting mesh plate 5 is provided below the storage vial rack 3. The storage vial rack is slidable in the refrigeration zone to achieve position adjustment. The supporting mesh plate 5 limits the movement of the storage vial rack 3.

In a further preferred implementation of this embodiment, the refrigeration device 1 includes a plurality of refrigeration zones 101, and the plurality of refrigeration zones 101 are arranged in an array in refrigerator component 104. The sample cooling and storage mechanism achieves electric refrigeration and liquid nitrogen refrigeration functions through the refrigerator component 104, saving resources and avoiding the impact of insufficient nitrogen supply or other special circumstances.

In a further preferred implementation of this embodiment, an upper end of the refrigeration device 1 is provided with movable insulation cover 105, and the movable insulation cover 105 rolls or slides to open or close the refrigeration device. The flexible insulation cover structure does not occupy much space inside the sample cooling and storage mechanism, opens or closes the refrigeration device as needed, and can be operated internally.

The movable insulation cover 105 includes two parallel guide rails 1051, movable rod 1052 with two ends slidably provided on the guide rails, and flexible insulation cover 1053 with one end provided on the movable rod and the other end connected to a counterweight and suspended. The movable insulation cover further includes drive motor 1054 and drive shaft 1055 connected to an output shaft of the drive motor. Driving wheel 1056 is provided on the drive shaft 1055. The driving wheel 1056 is synchronized and connected to driven wheel 1058 through driving belt 1057. The driving belt 1057 is provided with second slider 1059. An end of the movable rod 1052 is fixedly connected to the second slider 1059. The second slider 1059 is slidably fit with the guide rail 1051.

A process of opening the insulation cover is described below. The drive motor drives the drive shaft to rotate. The driving belt is provided between the driving wheel on the drive shaft and the driven wheel. The driving belt drives the second slider to move, thereby driving the movable rod to move. In this way, the flexible insulation cover is opened or closed.

In a further preferred implementation of this embodiment, the nitrogen supply tube assembly 4 includes solenoid valve 401, nitrogen supply coil tube 402, and heating tube 403. The nitrogen spraying tube 1021 is communicated with the nitrogen supply coil tube 402, and the nitrogen supply coil tube 402 is circled around the heating tube 403. The solenoid valve 401 controls the start of the heating tube 403. Each or each two refrigeration zones 101 are provided with one nitrogen supply assembly 4. The liquid nitrogen in the nitrogen supply coil tube 402 is heated by the heating tube 403 and then enters the refrigeration zone 101. The design avoids direct splashing of the liquid nitrogen at a too low temperature onto the storage vial rack 3 or an internal area in the refrigeration zone 101, reducing sample damage.

In a further preferred implementation of this embodiment, the gradient cooling device 2 includes liquid-nitrogen container 201, storage rack 202 located above an opening of the liquid-nitrogen container 201, and storage rack lifting device 203 for driving the storage rack to move up and down.

The storage rack lifting device 203 includes frame 204 and lifter 205 fixed to the frame. Lifting platform 206 of the lifter 205 is provided with mounting plate 207. The storage rack 202 is provided at a bottom end of the mounting plate 207. Lifting motor 208 is provided on the mounting plate 207. A body of the lifting motor 208 is fixed to the mounting plate, and an output shaft of the lifting motor 208 is connected to screw rod 209. The screw rod 209 is threaded to first slider 210. The first slider 210 is slidably fit with the mounting plate 207. Temperature sensor 214 is provided on the first slider 210. The temperature sensor 214 can be driven to enter the liquid-nitrogen container 201 for temperature measurement at any time.

When the storage vials need programed cooling, the storage vials are placed on the storage rack 202. The storage rack 202 has the same functional settings as the storage vial rack. The lifter 205 drives the storage vials on the storage rack into the liquid-nitrogen container 201. Due to the fact that the nitrogen supply to the liquid-nitrogen container 201 starts from a bottom part of the liquid-nitrogen container, an internal temperature of the liquid-nitrogen container 201 gradually decreases from top to bottom. The temperature at the opening of the liquid-nitrogen container 201 is between −10° C. and −20° C. The lifter drives the storage vials on the storage rack to stay in this temperature range for a period of time. Then, the storage vials descend to a certain height, such that the temperature field of the storage vial is between −20° C. and −40° ° C. The storage vials stay at this temperature field for a certain period of time and then drop to a certain height, causing the temperature field of the storage vials to be between −40° C. and −60° ° C. The storage vials stay at this temperature field for a certain period of time and then drop to a certain height, causing the temperature field of the storage vials to be between −60° C. and −80° C. The operation is repeated until the temperature field of the storage vials reaches below −80° C., thereby achieving programmed cooling of the storage rack.

In a further preferred implementation of this embodiment, the sample cooling and storage mechanism further includes three-axis robotic arm 6. The three-axis robotic arm 6 is provided above the refrigeration device 1 and the gradient cooling device 2 and is configured to move the storage vials in three directions. After the gradient cooling device 2 completes the programed cooling of the storage vials, the three-axis robotic arm 6 drives the storage vials or the storage vial rack with the storage vials to enter the refrigeration device for low-temperature storage. The storage vial rack with the storage vials are put into transfer tank 7, and then the transfer tank is put into the sample cooling and storage mechanism through the three-axis robotic arm.

In a further preferred implementation of this embodiment, the refrigeration zone 101 is a square box with a certain height, and an upper end surface of the square box is provided with a box insulation cover. The design is more suitable for the storage structure of the storage vials and the storage vial rack.

In a further preferred implementation of this embodiment, the gradient cooling device 2 further includes nitrogen delivery tube 211. One end of the nitrogen delivery tube 211 is communicated with the nitrogen supply tube, and the other end of the nitrogen delivery tube 211 serves as an open end and extends into the liquid-nitrogen container 201. The nitrogen delivery tube 211 is sheathed with guide sleeve 212. The guide sleeve 212 is provided with a plurality of vents 213. When the nitrogen liquid is supplied, the nitrogen delivery tube 211 will generate condensate water, so the guide sleeve 212 is needed to solve the problem of condensate water. The plurality of vents 213 of the guide sleeve 212 can export the condensate water generated by the nitrogen delivery tube 211 and achieve dehumidification inside the liquid-nitrogen container.

Those skilled in the art that the present disclosure is not limited to details of above exemplary embodiments, and the present disclosure can be implemented in other specific forms without departing from the spirit or basic features of the present disclosure. The embodiments should be regarded as exemplary and non-limiting in every respect, and the protection scope of the present disclosure is defined by the appended claims rather than the above description.

In addition, the above described are merely preferred implementations of the present disclosure, rather than limitations to the present disclosure. It should be noted that a person of ordinary skill in the art may further make improvements and modifications without departing from the technical principles of the present disclosure, and these improvements and modifications should be deemed as falling within the protection scope of the present disclosure. Meanwhile, it should be understood that although this specification is described in accordance with the implementations, it does not mean that each implementation only include an independent technical solution, and the description manner of the specification is only for clarity. Therefore, those skilled in the art should take the specification as a whole. The technical solutions in the embodiments can also be properly combined to form other implementations that can be understood by those skilled in the art.

What is claimed is:

1. A sample cooling and storage mechanism, comprising:
a refrigeration device and a gradient cooling device;
wherein the refrigeration device is configured to perform temperature-controlled refrigeration on storage vials;
the gradient cooling device is configured to perform programmed gradient cooling on the storage vials;
the refrigeration device comprises at least one refrigeration zone; a nitrogen spraying component, a heating component and a storage vial rack are provided in the refrigeration zone; the nitrogen spraying component is configured to spray nitrogen in the refrigeration zone; and the heating component heats an interior of the refrigeration zone;
the refrigeration device comprises a plurality of refrigeration zones, and the plurality of refrigeration zones are arranged in an array in a refrigerator component;
an upper end of the refrigeration device is provided with a movable insulation cover, and the movable insulation cover rolls or slides to open or close the refrigeration device;
the movable insulation cover comprises two parallel guide rails, a movable rod with two ends slidably provided on the guide rails, and a flexible insulation cover with one end provided on the movable rod and the other end connected to a counterweight and suspended; and
the movable insulation cover further comprises a drive motor and a drive shaft connected to an output shaft of the drive motor; a driving wheel is provided on the drive shaft; the driving wheel is synchronized and connected to a driven wheel through a driving belt; a second slider is provided on the driving belt; an end of the movable rod is fixedly connected to the second slider; and the second slider is slidably fit with the guide rail.

2. The sample cooling and storage mechanism according to claim 1, wherein the nitrogen spraying component comprises a nitrogen spraying tube; the nitrogen spraying tube is provided with a plurality of nitrogen spraying holes; and an end of the nitrogen spraying tube is communicated with a nitrogen supply tube assembly.

3. The sample cooling and storage mechanism according to claim 2, wherein the heating component comprises at least one electric heating element; the nitrogen spraying tube vertically runs through inside the refrigeration zone; and the electric heating element is vertically provided on an inner wall of the refrigeration zone.

4. The sample cooling and storage mechanism according to claim 3, wherein the storage vial rack is slidable up and down in the refrigeration zone, and a supporting mesh plate is provided below the storage vial rack.

5. The sample cooling and storage mechanism according to claim 2, wherein the nitrogen supply tube assembly comprises a solenoid valve, a nitrogen supply coil tube, and a heating tube; wherein the nitrogen spraying tube is communicated with the nitrogen supply coil tube; the nitrogen supply coil tube is circled around the heating tube; and the solenoid valve is configured to control a start of the heating tube.

6. A sample cooling and storage mechanism, comprising:
a refrigeration device and a gradient cooling device;
wherein the refrigeration device is configured to perform temperature-controlled refrigeration on storage vials;
the gradient cooling device is configured to perform programmed gradient cooling on the storage vials;
the refrigeration device comprises at least one refrigeration zone; a nitrogen spraying component, a heating component and a storage vial rack are provided in the refrigeration zone; the nitrogen spraying component is configured to spray nitrogen in the refrigeration zone; and the heating component heats an interior of the refrigeration zone;
the gradient cooling device comprises a liquid-nitrogen container, a storage rack located above an opening of the liquid-nitrogen container, and a storage rack lifting device for driving the storage rack to move up and down; and
the storage rack lifting device comprises a frame and a lifter fixed to the frame; a lifting platform of the lifter is provided with a mounting plate; the storage rack is provided at a bottom end of the mounting plate; a lifting motor is provided on the mounting plate; a body of the lifting motor is fixed to the mounting plate; an output shaft of the lifting motor is connected to a screw rod;

the screw rod is threaded to a first slider; and the first slider is slidably fit with the mounting plate, and a temperature sensor is provided on the first slider.

7. The sample cooling and storage mechanism according to claim 1, further comprising a three-axis robotic arm, wherein the three-axis robotic arm is provided above the refrigeration device and the gradient cooling device and is configured to move the storage vials in three directions.

8. The sample cooling and storage mechanism according to claim 1, wherein the refrigeration zone is a square box with a certain height, and an upper end surface of the square box is provided with a box insulation cover.

9. The sample cooling and storage mechanism according to claim 6, wherein the gradient cooling device further comprises a nitrogen delivery tube; one end of the nitrogen delivery tube is communicated with the nitrogen supply tube, and the other end of the nitrogen delivery tube serves as an open end and extends into the liquid-nitrogen container; the nitrogen delivery tube is sheathed with a guide sleeve; and the guide sleeve is provided with a plurality of vents.

10. The sample cooling and storage mechanism according to claim 3, wherein the nitrogen supply tube assembly comprises a solenoid valve, a nitrogen supply coil tube, and a heating tube; wherein the nitrogen spraying tube is communicated with the nitrogen supply coil tube; the nitrogen supply coil tube is circled around the heating tube; and the solenoid valve is configured to control a start of the heating tube.

11. The sample cooling and storage mechanism according to claim 4, wherein the nitrogen supply tube assembly comprises a solenoid valve, a nitrogen supply coil tube, and a heating tube; wherein the nitrogen spraying tube is communicated with the nitrogen supply coil tube; the nitrogen supply coil tube is circled around the heating tube; and the solenoid valve is configured to control a start of the heating tube.

12. The sample cooling and storage mechanism according to claim 2, further comprising a three-axis robotic arm, wherein the three-axis robotic arm is provided above the refrigeration device and the gradient cooling device and is configured to move the storage vials in three directions.

13. The sample cooling and storage mechanism according to claim 3, further comprising a three-axis robotic arm, wherein the three-axis robotic arm is provided above the refrigeration device and the gradient cooling device and is configured to move the storage vials in three directions.

14. The sample cooling and storage mechanism according to claim 4, further comprising a three-axis robotic arm, wherein the three-axis robotic arm is provided above the refrigeration device and the gradient cooling device and is configured to move the storage vials in three directions.

15. The sample cooling and storage mechanism according to claim 6, wherein the nitrogen spraying component comprises a nitrogen spraying tube; the nitrogen spraying tube is provided with a plurality of nitrogen spraying holes; and an end of the nitrogen spraying tube is communicated with a nitrogen supply tube assembly.

16. The sample cooling and storage mechanism according to claim 6, wherein the heating component comprises at least one electric heating element; the nitrogen spraying tube vertically runs through inside the refrigeration zone; and the electric heating element is vertically provided on an inner wall of the refrigeration zone.

17. The sample cooling and storage mechanism according to claim 6, wherein the storage vial rack is slidable up and down in the refrigeration zone, and a supporting mesh plate is provided below the storage vial rack.

* * * * *